July 10, 1962 G. DIEMER 3,043,959
SEMI-CONDUCTOR DEVICE FOR PURPOSES OF AMPLIFICATION OR SWITCHING
Filed Sept. 12, 1960
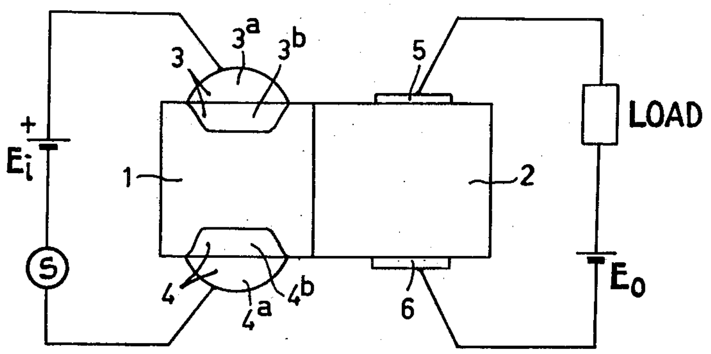
INVENTOR
Gesinus Diemer.
BY
Frank R. Jeifari
AGENT 3,043,959

SEMI-CONDUCTOR DEVICE FOR PURPOSES OF AMPLIFICATION OR SWITCHING

Gesinus Diemer, Eindhoven, Netherlands, assignor to North American Philips Company, Inc., New York, N.Y., a corporation of Delaware Filed Sept. 12, 1960, Ser. No. 55,454
Claims priority, application Netherlands Sept. 12, 1959
4 Claims. (Cl. 250—211)

For purposes of amplification or switching, it has already been proposed to use a semi-conductor device having a semi-conductor body built up of two members, in which radiation is produced in the one member of the body by recombination of charge carriers, this member consisting for example of a p-n recombination radiation source. The other member, which is coupled optically to the former member, comprises a semi-conductor having a forbidden energy gap or zone between its conduction band and valence band which is smaller than the energy quantum corresponding to the wavelength of the radiation produced in the one member. Its electric conduction is controlled in accordance with the intensity of the radiation intensity supplied from the one member. By p-n recombination radiation source is understood in normal manner here to mean a semi-conductor body having at least one p-n transition or junction in which the charge carriers required for the radiation recombination are obtained by injection of minority carriers in the proximity of the p-n transition when operating the transition in the forward direction. The wavelength of the radiation produced is determined by the value of the energy quantum or photons released in the recombination, and this recombination may take place either by a direct transition from conduction band to valence band or by a transition via an activator level lying between the energy bands.

By this combination of a recombination radiation source with a photo-conductive member, a semi-conductor device is obtained having an electric input which is formed by the supply electrodes of the electric energy for the radiation source in the one member, and having an electric output which is formed by the electrodes of the other photo-conductive member. It has already been proposed to combine these two members into one semi-conductor body, in which, however, the second photo-conductive member has a forbidden energy gap or zone smaller than the radiation quantum supplied to it and consequently also has a forbidden energy zone smaller than that of the one member in which the radiation is produced by recombination.

The present invention relates to a semi-conductor device of such a type comprising a combination of at least one p-n recombination radiation source constituting the electric input of the device with at least one photoconductive member coupled optically to said source and forming the electric output of the device, said combination being constructed into a structural unit, preferably combined into one body.

The invention provides a new and particularly suitable form of such a semi-conductor device which, by a particular choice of semi-conductor material for the photo-conductive member differing essentially from the already proposed semi-conductor device, inherently has much more favourable electric properties, such as a higher amplification factor with a more favourable energy efficiency.

In a semi-conductor device comprising a combination of at least one p-n recombination radiation source constituting the electric input of the device with at least one photo-conductive member coupled optically to said source and constituting the electric output of the device, said combination being constructed into a structural unit, preferably combined into one body, the photo-conductive member according to the invention consists of a semi-conductor having a forbidden energy zone between its conduction band and valence band which is equal to or larger than the radiation quanta produced by the p-n recombination radiation source and which contains activation centres causing active energy levels in the forbidden energy zone capable of excitation by the relative radiation quanta. By such active energy levels are understood here energy levels which, under the influence of the relative radiation quanta or photons, if necessary with the aid of the thermal energy of the crystal lattice, may supply free electrons to the conduction band or may absorb electrons from the valence band, as a result of which free holes are formed in the valence band. For that purpose, these active energy levels must naturally be situated at a sufficiently large energy distance from the relative energy band, so that they are not released already only by the thermal energy of the crystal lattice in a manner disturbingly decreasing the resistance in the absence of radiation. On the other hand, such active energy levels will have to be situated at such a distance from the relative band that carriers can be excited therefrom by the relative radiation quanta, if necessary with the aid of thermal energy, that is to say that this energy distance may in general at most equal the value of the relative radiation quantum or, in case of the use of thermal energy, may be only a little larger, namely by an amount corresponding to said energy. The dotation of semi-conductors with such centres by incorporating lattice deviations, such as impurities, is a measure known per se in the semi-conductor technology. For example, active energy levels may be obtained by incorporating donor impurities which, at a suitable distance from the conduction band, cause energy levels filled with electrons, or by incorporating acceptor impurities which cause unpopulated energy levels situated at the suitable distance from the valence band. Therefore, in contrast with the known semiconductor device employing a semi-conductor having a smaller forbidden energy zone than the generated radiation quantum, the semi-conductor device according to the invention employs just a forbidden energy zone equal to or larger than the radiation quantum. By this particular choice according to the invention, the favourable condition is afforded in the semi-conductor device according to the invention that a semi-conductor having a higher resistivity is used, as a result of which a higher electric field strength may be permitted in the photo-conductive member which renders a higher amplification factor of the photo-conductive member and, as a result, of the whole device possible. In addition, the device according to the invention has the advantage that the absorption of the radiation quanta or photons in the photo-conductive member can be distributed efficiently by suitable choice of the location of incorporating the active energy levels. In the already proposed semi-conductor device, the absorption predominantly takes place in a thin layer of the photo-conductive member immediately adjoining the one member in which the radiation is produced, which layer often is hardly accessible for electrodes and therefore unsuitable for the photoconductive material in connection with the position of the electrodes. In the device according to the invention it is possible to distribute the absorption more homogeneously or even locate in the most desired position, which benefits the amplification and the energy efficiency. Therefore, in the semi-conductor device according to the invention, the activation centres are preferably incorporated mainly in that part of the photo-conductive member which coincides with the normal current path between the electrodes occurring in the absence of radiation. In order to achieve the desired local distribution of activation centres in the photoconductor body, methods known in the semi-conductor art, like diffusion from the atmosphere or from an activator source placed at the adjoining surface of the body, can be used, while, if desired, other parts of the body can be masked.

The above advantages come into prominence particularly in those cases in which the semi-conductor material of the photo-conductive member has a forbidden energy zone which is larger than the energy content of the relative radiation quantum. An improvement in this direction with respect to the known semi-conductor device is achieved already also when the forbidden energy zone and the radiation quantum are of equal value. According to a further aspect of the invention, the p-n recombination radiation source and the photo-conductive member, in case of equality of forbidden energy zone and radiation quantum, are preferably of the same semi-conductor material having the same forbidden energy zone, said members being constructed from a single semi-conductor body. This form according to the invention has the additional advantage that no difference in index of refraction exists between the two members, as a result of which the radiation of the one member may pass into the other without any internal optical reflection. In other cases, however, in which the above advantages are of particular importance, a semiconductor is preferred having a forbidden energy zone larger than the radiation quantum, the more so since it is not necessary to choose the forbidden energy zone much larger than the radiation quantum, the resistivity of an intrinsic semi-conductor increasing exponentially with the value of the forbidden energy zone, while even then the index of refraction of the various semi-conductors differs relatively little. The value of the forbidden energy zone, for example, for germanium and silicon amounts to approximately 0.72 e.v. and 1.12 e.v. respectively and the resistivity of intrinsic germanium amounts to approximately 60 ohm-cm. and the resistivity of intrinsic silicon is already higher than 1000 ohm-cm., while the index of refraction of germanium and silicon differs only little and amounts to 4.0 and 3.45 respectively.

In order that the invention may be readily carried into effect, it will now be described, by way of example, with reference to the drawing and some examples.

The FIGURE shows diagrammatically a longitudinal sectional view of an embodiment of a semi-conductor device according to the invention. The p-n recombination radiation source 1 is constituted by a p-type electrode 3 comprising a metal contact *3a* and an associated semi-conductor zone *3b* of the p-type, by an n-type electrode 4 comprising a metal contact *4a* and an associated semi-conductor zone *4b* of the n-type, and the intermediate high-ohmic substantially intrinsic semi-conductor body. The result is a p-i-n structure, which is the equivalent of a p-n junction. Two ohmic electrodes, indicated by 5 and 6 respectively, are provided opposite to one another on the photo-conductive member 2. The photo-conductive member 2 also consists of a high-ohmic substantially intrinsic semi-conductor material. In case of various semi-conductors, the two members may be combined to one body using technologies known per se, for example fusing, depositing by vapour in successive layers and transition via mixed crystal formation. In member 1 a positive voltage is applied to electrode 3 with respect to electrode 4 as a result of which in the semi-conductor part situated between these electrodes holes are injected from the p-type electrode 3 and electrons from the n-type electrode 4. These injected minority carriers recombine in the intermediate semi-conductor member, radiation of a given wavelength being produced dependent on the recombination process. When this recombination takes place by direct transition between the conduction band and valence band, the energy value of the radiation quanta or photons produced will be substantially equal to the value of the forbidden energy zone of this semi-conductor member. In many cases, however, radiation centres are built into this semi-conductor member which cause the recombination to take place via an intermediate level lying in the forbidden energy zone, as a result of which the energy content of the radiation quantum will be smaller than the forbidden energy zone, namely, equal to the value of the recombination transition. The photo-conductive member 2 consists of a semi-conductor having a forbidden energy zone between the conduction band and the valence band which is equal to or larger than the energy content of the radiation quantum produced in member 1. In the photo-conductive member 2 activation centres are incorporated in particular in the current path between the two electrodes 5 and 6, which centres cause active energy levels for the relative radiation quanta as a result of which a number of free charge carriers dependent on the radiation intensity is released in one of the energy bands under the influence of these radiation quanta, in consequence of which the electric conduction between the electrodes 5 and 6 may be influenced as a function of the radiation intensity. The radiation intensity is variable with the electric energy supplied to the p-n recombination radiation source. In a suitable operating circuit, a direct current bias source $E_1$ is connected in series with the input signal source S between the electrodes 3 and 4, so that the electrode 3 is positively based with respect to electrode 4. In the output circuit, a load L is connected in series with a bias source $E_o$ between the ohmic electrodes 5 and 6.

Some examples will now be described in greater detail for further illustration.

The semi-conductor member 1 of the p-n radiation source may consist for example of substantially intrinsic germanium having a resistivity of approximately 50–60 ohm-cm., the electrode 3 being formed by an alloyed indium electrode to which a few percent of gallium has been added, the electrode 4 being formed by an alloyed lead-antimony or lead-arsenic electrode. The electrode spacing may be about 200 microns. When operating the p-n transition in the forward direction, radiation quanta having an energy content of approximately 0.72 e.v. can be produced in the semi-conductor member 1. The photo-conductive member 2 may consist for example of silicon having a forbidden energy zone of approximately 1.12 e.v. In the normal current path between the ohmic electrodes 5 and 6, zinc in an atomic concentration of approximately $10^{-5}$ atoms/atom of Si is incorporated in the photo-conductive member 2. The impurity zinc causes two acceptor levels in the forbidden energy zone of silicon, one energy level of which corresponds to the single negative charge condition of the acceptor and is situated 0.31 e.v. above the valence band and the other energy level corresponds to the double negative charge condition of the acceptor and is situated at 0.55 e.v. above the valence band. For the given radiation quanta of 0.72 e.v., these zinc-acceptor levels may operate as centres active for the photo-conduction because the relative quanta or photons will excite electrons from the valence band to these levels thus rendering hole conduction in the valence band possible. Dependent on the intensity, these levels will be capable of being charged first singly negatively and then doubly negatively.

Although the above-mentioned activation possibility of the photo-conductive member is suitable, it yet has the drawback that it does not completely utilise the maximally obtainable value of the resistivity owing to the fact that the active energy levels are not yet situated as far as possible from the relative energy band. The active energy levels will preferably be chosen such that the Fermi-level lies approximately in the centre of the forbidden energy zone. By the addition of a donor level situated near the conduction band, the charge condition of the zinc levels may be controlled in a manner such that the resistivity of the silicon substantially approaches the maximum intrinsic value of the resistivity, namely by adding so much of these donor levels that the Fermi-level at the operating temperature is situated substantially in the centre of the band. In the present case of an atomic concentration of approximately $10^{-5}$, atoms of Zn per atom of Si, this means that by the addition of donors the zinc-acceptor level will have to be populated for a large part by electrons to the doubly-negative charge condition, that is to say, that owing to the two acceptor levels which zinc possesses, nearly twice as many donor atoms as zinc atoms will have to be added to position the Fermi-level at operating temperature approximately in the centre of the forbidden energy zone. It will be possible for example, to add an atomic concentration of approximately $1.9\times10^{-5}$ of phosphor atoms. In this condition, electrons can be transferred from the doubly negatively charged zinc levels to the conduction band by the given radiation quanta which electrons may give rise there to free electron conduction. The electrode material for the electrodes 5 and 6 may in this case consist of a lead-nickel alloy with for instance 1% by weight of nickel, and the spacing between these electrodes may be for instance 300 microns. A semi-conductor activated with an impurity of a given type and to which a second impurity, a so-called co-activator, is added to render the semi-conductor substantially as resistive as possible, is normally called a compensated semi-conductor. In the present case, in which the semi-conductor is an activated photo-conductor, a compensated activated photo-conductor is obtained by such a compensation process. According to a further aspect of the invention, a substantially compensated activated photo-conductor is preferably used in the photo-conductive member. It will be understood that, in addition to the present case in which a deep-situated acceptor level is brought into the suitable charge condition and compensated by a donor level situated near the conduction band, it is also possible to use a compensated activated photoconductor in which a deep-situated donor level is brought into the suitable charge condition and compensated by an acceptor level situated near the valence band.

In the above example, a semi-conductor was used in the photo-conductive member having a forbidden energy zone which was larger than the generated radiation quantum. Now an example will be given of a semi-conductor device in which the same semi-conductor having the same forbidden energy zone is used for the p-n recombination radiation source and the photo-conductive member. For that purpose, the semi-conductor body may consist for example of high-resistive silicon, in which one half of the body is used as the photo-conductive member and may be activated in the same manner as indicated in the previous example, while in the other half of the body the p-n recombination radiation source is incorporated, the p-type electrode of which may be obtained for example by alloying aluminum, and the n-type electrode for example by alloying a gold-antimony alloy.

It is still noted that the invention is naturally not to be restricted to the embodiment given by way of example. Also other semi-conductors such as semi-conductor compounds, like, for instance, silicon carbide or cadmium telluride may be used and the arrangement of the electrodes on the body may also be modified. In addition it is possible, for example, to combine more than one p-n radiation source into a structural unit using a photo-conductor, or a p-n radiation source having more than one photo-conductive member, or more than one p-n radiation source having more than one photo-conductive member. Since the amplification factor of a semi-conductor device according to the invention may be considerably larger than 1, a regenerative effect may be obtained by using electric feedback coupling, as a result of which it is possible to obtain bistable elements, oscillators and multivibrators.

What is claimed is:

1. A semiconductor arrangement comprising a first semiconductive region containing p and n zones forming at least one junction, contacts to the p and n zones, an input circuit including potential means coupled to the contacts for biasing the junction in the forward direction, whereby carriers are injected into the first region which, when recombined, cause the generation of photons having a given value of energy, a second photoconductive semiconductive region adjacent the said first region and adapted to intercept and absorb a portion of said generated photons, spaced contacts to said second region, and an output circuit including potential means coupled to the contacts to said second region for establishing an electric field therein, said second region being constituted of a semiconductor whose forbidden energy gap is at least equal to the said given value of photon energy, said semiconductor of the second region further containing activator centers establishing in the forbidden energy gap energy levels which are capable of excitation by the said generated photons, but not solely by thermal energy, whereby the current in the output circuit is a function of the intensity of the generated radiation.

2. A semiconductor arrangement comprising a common body of semiconductive material having a first semiconductive region containing p and n zones forming at least one junction, contacts to the p and n zones, an input circuit including potential means coupled to the contacts for biasing the junction in the forward direction, whereby carriers are injected into the first region which, when recombined, cause the generation of photons having a given value of energy, a second semiconductive region in the body adjacent the said first region and adapted to intercept and absorb a portion of said generated photons, spaced contacts to said second region, and an output circuit including potential means coupled to the contacts to said second region for establishing an electric field therein, said second semiconductive region containing activator centers establishing in the forbidden energy gap energy levels capable of excitation by the said generated photons, but not solely by thermal energy, whereby the current in the output circuit is a function of the intensity of the generated radiation.

3. A semiconductor arrangement comprising a first high-resistance semiconductive region containing p and n zones forming two junctions, contacts to the p and n zones, an input circuit including potential means coupled to the contacts for biasing the junctions in the forward direction, whereby carriers are injected into the first region which, when recombined, cause the generation of photons having a given value of energy, a second high-resistance photoconductive semiconductive region adjacent and integral with the said first region and adapted to intercept and absorb a portion of said generated photons, spaced contacts to said second region, and an output circuit including potential means coupled to the contacts to said second region for establishing an electric field therein, said second region being constituted of a substantially compensated semiconductor whose forbidden energy gap is at least equal to the said given value of energy, said semiconductor of the second region further containing activator centers in at least the portion thereof between the spaced contacts establishing energy levels in the forbidden gap capable of excitation by the said generated photons, but not solely by thermal energy, whereby the current in the output circuit is a function of the intensity of the generated radiation.

4. A semiconductor arrangement as set forth in claim 3 wherein the first semiconductive region is intrinsic germanium, and the second semiconductive region is intrinsic silicon.

(References on following page)

References Cited in the file of this patent

UNITED STATES PATENTS

| | | |
|---|---|---|
| 2,836,766 | Halsted | May 27, 1958 |
| 2,863,056 | Pankove | Dec. 2, 1958 |
| 2,885,564 | Marshall | May 5, 1959 |
| 2,929,923 | Lehovec | Mar. 22, 1960 |
| 2,959,681 | Noyce | Nov. 8, 1960 |

OTHER REFERENCES

Tomlinson: Journal of the British Institute of Radio Engineers, vol. 17, No. 3, March 1957 (pp. 151–154).

Coblenz: Electronics, vol. 30, No. 11, Nov. 1, 1957 (pp. 144–149).

The Role of Solid State Phenomena in Electric Circuits, Polytechnic Institute of Brooklyn, distributors: Interscience Publishers, New York, 1957; pp. 275–287.